United States Patent
Parruck et al.

(10) Patent No.: US 6,349,098 B1
(45) Date of Patent: Feb. 19, 2002

(54) METHOD AND APPARATUS FOR FORMING A VIRTUAL CIRCUIT

(75) Inventors: Bidyut Parruck, Milpitas; Makarand Dharmapurikar, San Jose, both of CA (US); Uday Govind Joshi, Malad (IN)

(73) Assignee: PaxoNet Communications, Inc., Fremont, CA (US)

(*) Notice: Subject to any disclaimer, the term of this patent is extended or adjusted under 35 U.S.C. 154(b) by 0 days.

(21) Appl. No.: 09/062,301

(22) Filed: Apr. 17, 1998

(51) Int. Cl.7 .................................................. H04L 12/56
(52) U.S. Cl. ......................................................... 370/395
(58) Field of Search ................................. 370/395, 397, 370/399, 408, 396, 398, 400, 407, 412, 413, 421, 425, 414, 392, 389, 352, 252, 254, 229, 234, 235, 232, 411, 442

(56) References Cited

U.S. PATENT DOCUMENTS

| | | | |
|---|---|---|---|
| 5,436,893 A | * | 7/1995 | Barnett ....................... 370/60.1 |
| 5,440,547 A | * | 8/1995 | Easki et al. .................... 370/60 |
| 5,452,297 A | * | 9/1995 | Hiller et al. ................. 370/60.1 |
| 5,483,527 A | * | 1/1996 | Doshi et al. ................. 370/60.1 |
| 5,689,505 A | * | 11/1997 | Chiussi et al. ............... 370/388 |
| 5,719,864 A | * | 2/1998 | Badger et al. ............... 370/395 |

* cited by examiner

Primary Examiner—Dang Ton
(74) Attorney, Agent, or Firm—Martine & Penilla, LLP; Joseph A. Nguyen

(57) ABSTRACT

An improved method and apparatus for automatically forming a virtual circuit in an ATM switch is disclosed. In one aspect of the invention, the virtual circuit may be used to transport an ATM data cell included in an associated communication session. The disclosed method includes the following operative steps. First, a configuration cell is created. Next the virtual circuit is formed by passing the configuration cell to a destination node by way of at least one connective node. The configuration cell updates and validates an associated connection table capable of defining a virtual link. The virtual link being part of the virtual circuit.

11 Claims, 14 Drawing Sheets

METHOD AND APPARATUS FOR FORMING A VIRTUAL CIRCUIT

FIELD OF THE INVENTION

The present invention relates to digital data networks. More particularly, the present invention relates to apparatus and methods for efficiently forming a virtual circuit.

BACKGROUND OF THE INVENTION

Asynchronous Transfer Mode (ATM) is an emerging technology in the fields of telecommunication and computer networking. ATM permits different types of digital information (e.g., computer data, voice, video, and the like) to intermix and transmit over the same physical medium (i.e., copper wires, fiber optics, wireless transmission medium, and the like). ATM works well with data networks wherein digital data from a plurality of communication devices such as video cameras, telephones, television sets, facsimile machines, computers, printers, and the like, may be exchanged. Communication between the above mentioned data networks requires a technique of bi-directionally transporting a stream of related ATM cells (referred to as a "call") between a variety of sources and receivers. One such arrangement is a single source sending to a single receiver known in the art as a point to point (or unicast) as exemplified by a person to person telephone connection. Another possible arrangement is from one source to multiple receivers known in the art as point to multipoint (or multicast). One such multipoint system is exemplified by a conventional video on demand (referred to as VoD) system where any number of end users (home consumers, for example) may communicate real time with a root server. The root server in turn commands a main server to transmit the requested selection to the requester end user.

To facilitate discussion, prior art FIG. 1A illustrates a digital network 100, including an ATM switch 102 and a plurality of communication devices 210, 220, 230, 310, 320, and 330. ATM switch 102 represents a digital switch suitably arranged to couple two or more of communication devices 210, 220, 230, 310, 320, and 330 in either a bi-directional or uni-directional mode. ATM switch 102 may also represent a data network such as a local area network (LAN), a wide area network (WAN), or the global data network popularly known as the Internet. Each of communication devices 210, 220, 230, 310, 320, and 330 is coupled to ATM switch 102 via associated ATM ports 210(p), 220(p), 230(p), 310(p), 320(p), and 330(p) Each ATM port may include a Segmentation and Reassembly layer (SAR) and a Service Access Point (SAP). The SAR provides a method of breaking up into cells arbitrarily sized packets associated with any of the plurality of communication devices 210, 220, 230, 310, 320, and 330 and reassembling them such that information from different communication devices may be readily intermixed and transmitted regardless of its original format. The SAP function is twofold, first, in an outgoing call to a destination port, a destination SAP specifies the ATM address of the destination port; secondly, when preparing to respond to an incoming call, a local (or receiver) SAP specifies the ATM address of the receiving port.

A switch matrix 260 couples selected ones of the incoming ports to selected ones of the destination ports. In our example, port 210(p) may be couple to any of ports 220(p), 230(p), 310(p), 320(p), and 330(p) by way of switch matrix 260. An interconnect bus (not shown) couples processors associated with each bi-directional port and switch matrix 260 and is used to transfer all transactions between the processors.

FIG. 1B is an illustration of an ATM cell 120 representative of a UNI (User-to-Network Interface) system. ATM cell 120 includes 53 octets of 8 bits each. The 53 octets are grouped into two fields, the cell header 122 and the payload or information field 130. The cell header 122 contains protocol control information including data fields VPI (Virtual Path Identifier) and VCI (Virtual Circuit Identifier) used to define a virtual circuit over which ATM data cells corresponding to a call are transported through ATM switch 102. Cell header 122 also contains other protocol control information such as Payload Type Indicator (PTI), Header Error Control (HEC), and Generic Flow Control (GFC), and Cell Loss Priority (CLP) each of which corresponds to a desired Quality of Service (QoS) associated with the virtual circuit defined by VPI, VCI. QoS parameters can be either specified explicitly by the user or implicitly associated with specific service requests. The payload 130 is an information field of 48 octets containing the data to be transported from the sender port to the receiver port over the aforementioned virtual circuit.

Referring to FIG. 1C, a conventional method of setting up virtual circuit capable of servicing a unicast transmission through microprocessor based ATM switch system 100 will be discussed. For sake of this discussion only, assume a call initiator (not shown) wishes to use a telephone 201 to communicate with a receiver (also not shown) who uses a computer 331 to access an internet provider (IP) telephony service. In order to successfully couple telephone 201 to computer 331, ATM switch system 102 must set up a connection, referred to as a virtual circuit between incoming port 210(p) and receiving port 330(p). It should be noted that all connections are bi-directional and the distinction between sender and receiver is purely artificial and is for illustrative purposes only.

The call initiator begins the call setup procedure by using telephone 201 to dial the telephone number of the intended receiver. A SETUP signal 301a is then forward from an input processor 216 to a network processor 266 by way of a bus 270. Network processor 266, in turn, forwards SETUP signal 301a hop-by-hop to output processor 316 also by way of bus 270. SETUP signal 301a may include routing, QoS parameters, as well as additional parameters related to traffic control and shaping.

Upon receipt of SETUP signal 301a, network processor 266 echoes back a CALLPROCEEDiNG signal 301b to Input processor 216. CALLPROCEEDING signal 301b contains the virtual path indicator/virtual circuit indicator (VPI/VCI) associated with an arbitrated virtual circuit capable of transporting the ATM cells associated with the call. Upon receipt of SETUP signal 301a, output SAP processor 316 sends CALLPROCEEDING signal 310b to network processor 266. If output processor 316 accepts the call (based on a predetermined conflict resolution algorithm), it responds by sending a CONNECT signal 301c to input processor 216 by way of network processor 266 over bus 270. The last message of the call set up procedure is a CONNECT ACKNOWLEDGE signal 301d which is sent by input processor 216 to network processor 266 and output processor 316 over bus 270. The virtual circuit coupling telephone 201 to computer 331 is now available to transport the ATM data cells associated with the call.

At the conclusion of the call, either party may initiate a RELEASE signal that is forwarded to network processor 266 over bus 270. Network processor 266 echoes back a RELEASE COMPLETE signal to both input processor 216 and output processor 316 over bus 270. The RELEASE COMPLETE signal results in the virtual circuit associated with the just completed call to be invalidated.

A point to multipoint, or multicast, call is set up in a similar fashion but includes the additional steps related to adding and ultimately removing the additional receivers (or leafs). By way of example, a root will originate the connection that eventually terminates at two or more leaf nodes. The initial set up procedure is the same as discussed above, except that the original signaling request identifies the call as multicast (i.e., having two or more destination ports). The root, which in our discussion would be input processor 216, signals network processor 266 over bus 270 the address of the first leaf node. New destinations (referred to as multi-leaf nodes) will be added by way of an ADD PARTY signal also sent over bus 270.

For peak efficiency, it is generally desirable to have an ATM switch that can handle a very large number of simultaneous connections while switching ATM data cells with minimal delay and maximum data integrity. Unfortunately, the high bandwidth demanded by such a design may be limited by the available bus bandwidth associated with interconnection bus 270. It should be clear from FIG. 1C that, for example, every unicast virtual circuit set up and tear down requires at least twelve transactions (eight to set up the virtual circuit and four to tear it down after completion of the call). For a multicast call, this set up and tear down requirement is even more burdensome as each additional leaf requires at least four additional signals to set up and tear down the multicast virtual circuit. Unfortunately, the bus bandwidth associated with interconnect bus 270 provides an upper limit on the ultimate speed of ATM switch system 100 since a major source of delay is the communications delays imposed by the interconnection bus 270 that connects the various processors.

By way of example, attempting to solve the speed problem associated with a single bus by increasing the speed and/or the number of processors connected to the bus is also of limited value. As the number of connections increase, the amount of overhead data, related to for example error detection, on the bus degrades overall system performance. Unfortunately, as the processor speeds increase, the feasible number of processors that can be connected through a single bus decreases. An additional problem with using a single bus is that performance degrades as more devices are added to the bus. This means that the bandwidth of a bus available to a processor actually shrinks as more processors are added to the bus.

Thus, there is a need for techniques to reduce the number of transactions transmitted over the ATM switch system bus used to configure the associated virtual circuit in an ATM switch system.

SUMMARY OF THE INVENTION

A method of automatically forming a virtual circuit is disclosed. In one aspect of the invention, the virtual circuit may be used to transport an ATM data cell included in an associated communication session. The disclosed method includes the following operative steps. First, a configuration cell is created. Next the virtual circuit is formed by passing the configuration cell to a destination node by way of at least one connective node. The configuration cell updates and validates an associated connection table capable of defining a virtual link. The virtual link being part of the virtual circuit.

In another aspect of the invention, an automatic virtual circuit configurator is disclosed. The configurator includes a configuration request cell generator capable of generating a configuration request cell. The configuration request cell having a plurality of routing parameter pointers and a plurality of quality of service parameters used to define a virtual circuit. The configurator also includes a configuration cell translator coupled to the configuration request cell generator. The configuration request cell translator being disposed to receive the configuration request cell. The configuration cell translator being capable of reading selected ones of the plurality of routing parameters associated with selected routing parameter pointers included in a look up table. The look up table being associated with a memory device which includes one of a plurality of connection tables used to store appropriate routing and quality of service parameters. The configuration cell translator being capable of forming a configuration set up cell by combining the selected ones of the routing parameters and selected quality of service parameters used to define the virtual circuit. Furthermore, the configuration cell configurator includes a configuration cell handler disposed to receive the configuration set up cell coupled to the configuration cell translator. The configuration cell handler being capable of updating the first connection table with the selected routing and quality of service parameters associated with the virtual circuit and also capable of passing the configuration set up cell to a selected one of a plurality of connective nodes included within the ATM switch.

BRIEF DESCRIPTION OF THE DRAWINGS

The present invention is illustrated by way of example, and not by way of limitation, in the figures of the accompanying drawings. In the following figures, like reference numerals refer to analogous or similar elements to facilitate ease of understanding.

DESCRIPTION OF THE PREFERRED EMBODIMENTS

An invention is described for improving communication among devices that are coupled to Asynchronous Transfer Mode (ATM) digital data networks. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

The invention relates, in one embodiment, to an improved method and apparatus for configuring a virtual circuit used to transport associated ATM cells in an ATM switch system. A virtual circuit used to transport ATM cells in an ATM switch system is formed when a configuration set up cell containing a plurality of routing and QoS parameters updates a plurality of connection tables. Each of the updated connection tables may be associated with a connective node within the ATM switch wherein each connection table stores the proper link and port data as well as appropriate QoS parameters associated with the virtual circuit. The virtual circuit is defined when the configuration set up cell is transported from one connective node to another by way of connective links separate and distinct from processor interconnect bus. In this manner, the number of bus transactions required to configure the virtual circuit is substantially reduced resulting in faster set up times and higher number of connections.

It should be noted that for clarity a single input and a single associated output port are discussed, however, any number of independent or related inputs might in fact be coupled to any number of independent or related outputs. By way of example, a Video on Demand (VoD) system as already discussed may represent one application well suited for the inventive switch system as it may include any number of independent root servers and any number of leafs (or end users).

Figure 1A:
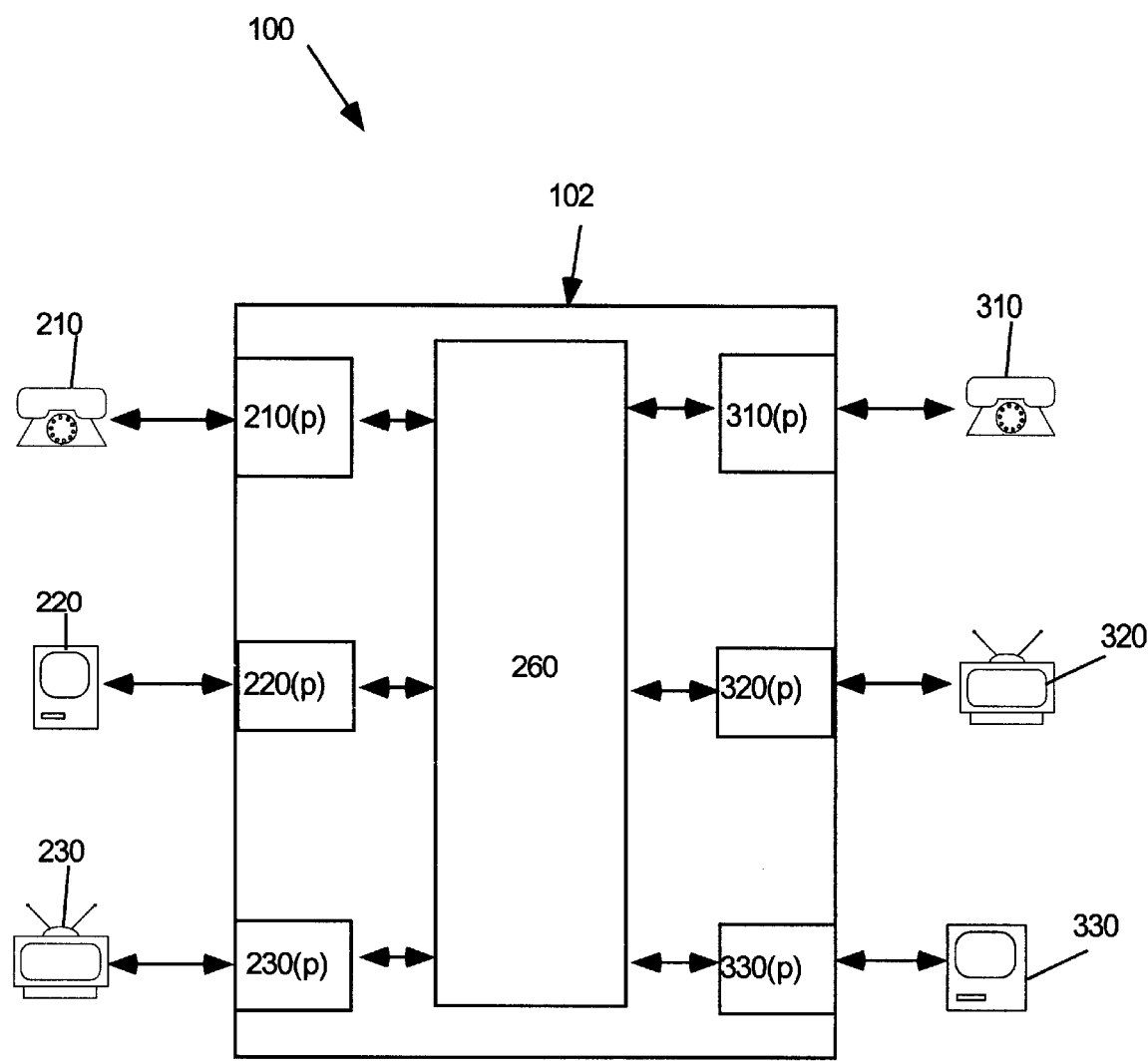
FIG. 1A is a representative digital network illustrating a disparate group of communication devices interconnected by way of an ATM switch.
Figure 1B:
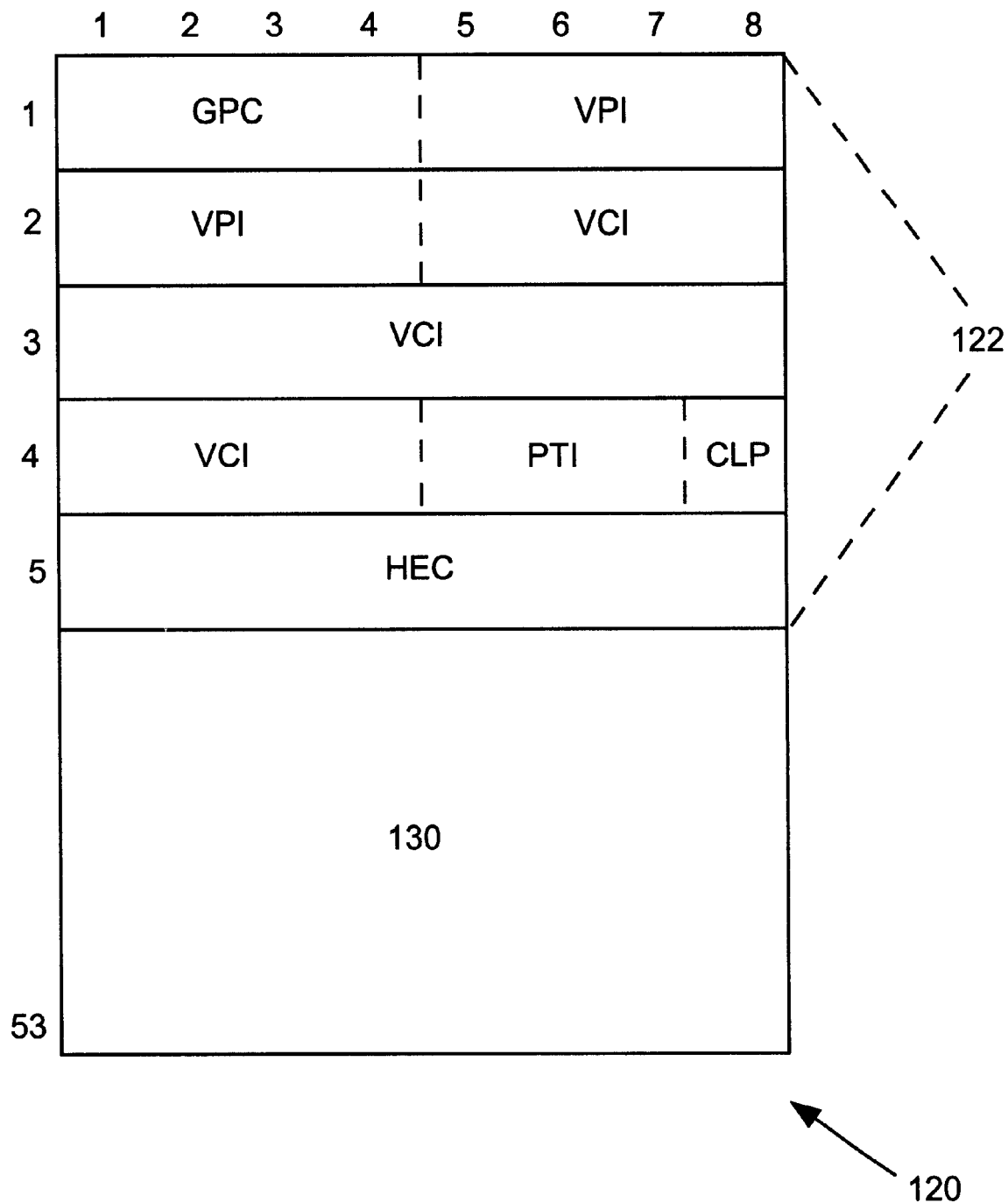
FIG. 1B is a representation of a conventional ATM cell highlighting a cell header wherein is shown a plurality of data fields used to define a virtual circuit and Quality of Service (QoS) parameters associated with an appended data field.
Figure 1C:
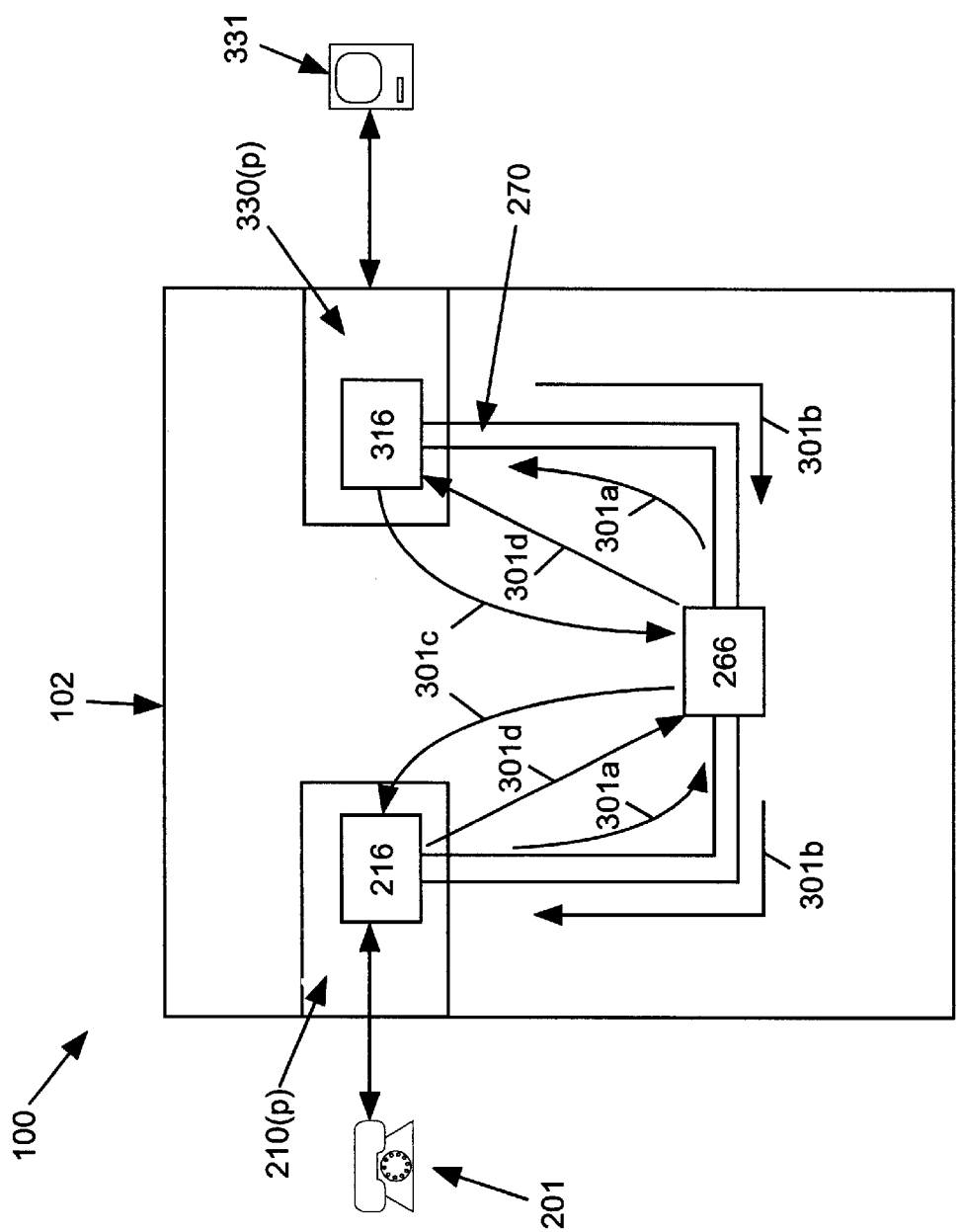
FIG. 1C is a transaction map showing the inter processor transactions necessary for configuring a virtual circuit wherein a conventional ATM cell as shown in FIG. 1B may be transported through an ATM switch as shown in FIG. 1A.
Figure 2:
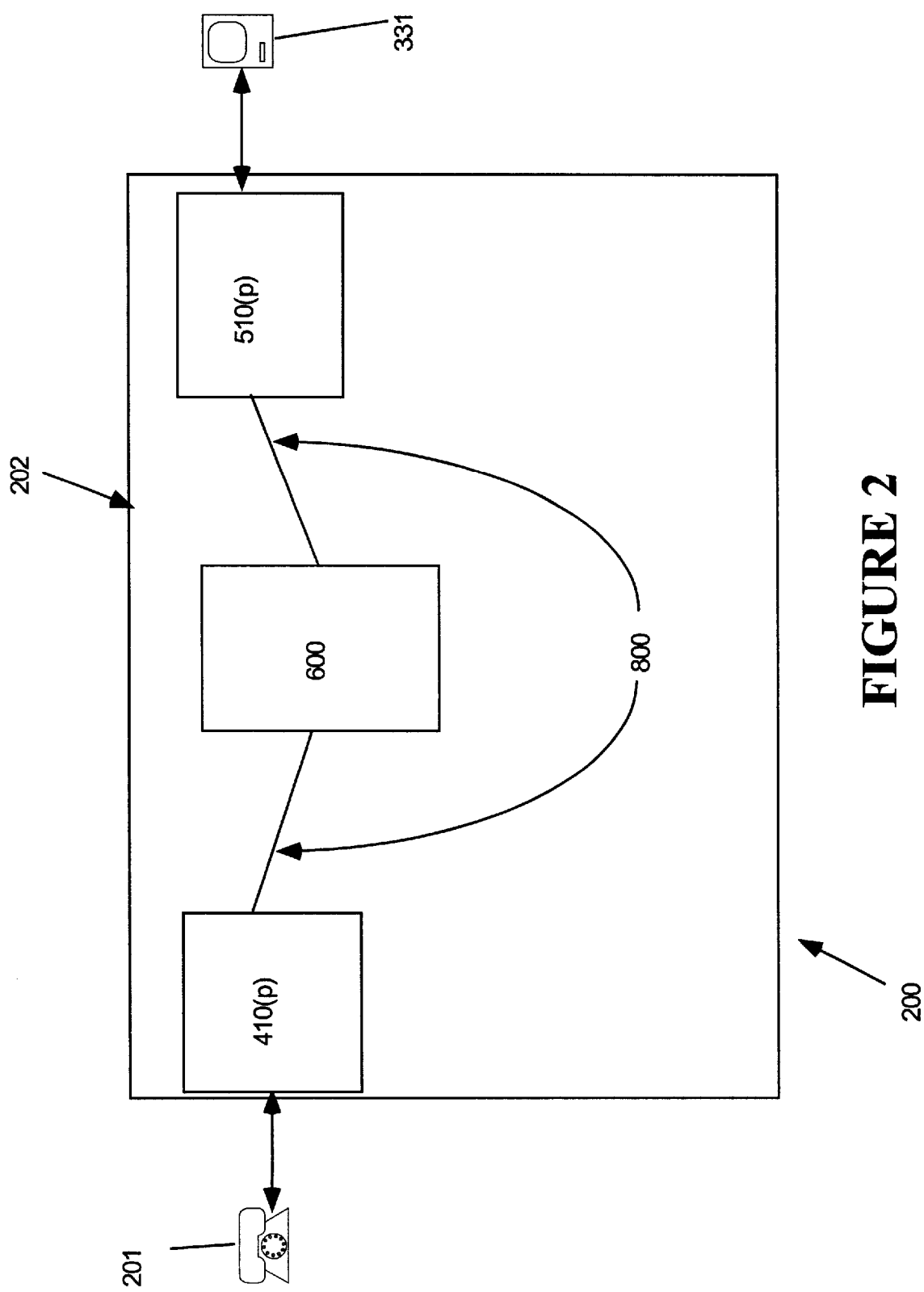
FIG. 2 is a representation of a digital network that includes an ATM switch in accordance with one embodiment of the invention.

A digital network utilizing an ATM switch in accordance with an embodiment of the invention is now described. Referring first to FIG. 2 which shows a digital network 200 that may be used to couple communications devices 201 and 331 by way of digital switch 202 in accordance with an embodiment of the invention. Communication devices 201 and 331 are coupled to a first bi-directional port 410(p) and a second bi-directional port 510(p), respectively. A virtual circuit 800 linking ports 410(p) and 510(p) by way of a switch unit 600 couples devices 201 and 331. Virtual circuit 800 is associated with a call made between devices 201 and 331 only for the duration of the call. To end the call, either party sends a release signal, the call ends and virtual circuit 800 is invalidated, or otherwise referred to as torn down. The call is executed when call related ATM cells are bi-directionally transported from port 410(p) to 510(p) subject to all applicable QoS and traffic requirements associated with virtual circuit 800.

Figure 3:
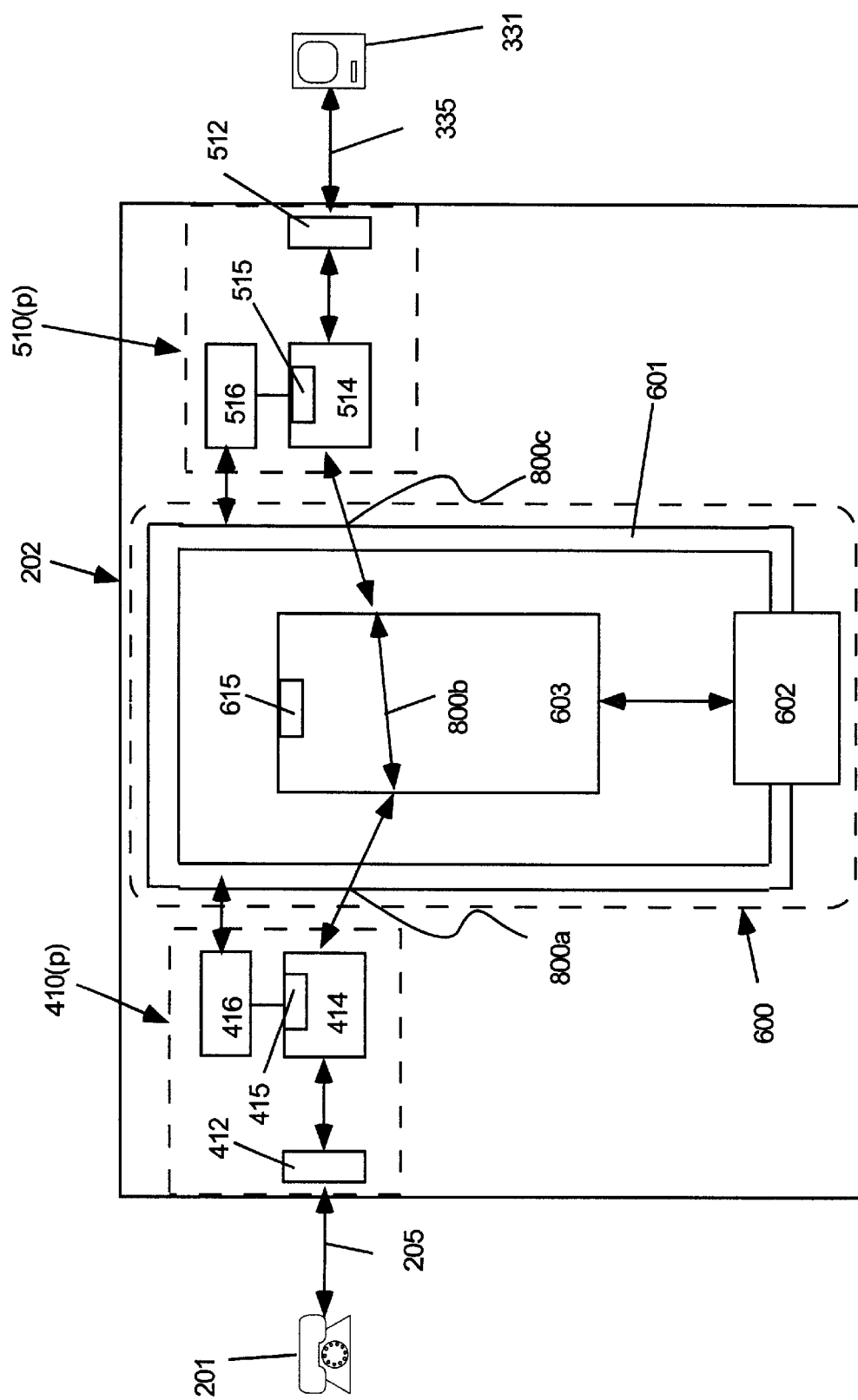
FIG. 3 is a schematic block diagram of a digital network which includes a multi-processor ATM switch arranged to bi-directionally transport ATM cells associated with a call from a first bi-directional port to an associated second bi-directional port by way of a switching unit in accordance with one embodiment of the invention.

FIG. 3 is a schematic block diagram of ATM switch 202 as shown in FIG. 2 in accordance with an embodiment of the invention. As shown, first bi-directional port 410(p) hereinafter referred to as InPORT 410(p) includes an input Segmentation and Reassembly unit InSAR 412 coupled to input Service Access Port InSAP 414. In the described embodiment, InSAP 414 includes a first input configuration cell configurator InCCC 415 arranged to receive a configuration request cell received by InSAR 412. InSAP 414 is, in turn, coupled to InPORT processor 416 as well as an input node (not shown) of switch unit SU 600.

SU 600 includes a switch matrix 603 having a plurality of first and second nodes (not shown) selectively coupled as directed by a switch processor 602 so as to form a virtual link 800b by which ATM cells may be bi-directionally transported through SU 600. Virtual link 800b may be combined with a virtual link 800a and a virtual link 800c to form virtual circuit 800 thereby providing an appropriate path for the transport of call related ATM cells from InPORT 410(p) to OutPORT 510(p). It should be noted that InPORT processor 416, switch processor 602 and an OutPORT processor 516 included within OutPORT 510(p) are coupled by way of a processor bus 601. In the described embodiment, device 201 may be coupled to InPORT 410(p) by way of a connector 205 and, in a similar manner, device 331 may be coupled to OutPORT 510(p) by way of a connector 335. Connectors 205 and 335 may be copper wires, fiber optics, wireless transmission medium, and the like.

In the described embodiment, a configuration set up cell arranged to define virtual circuit 800 is created from routing parameters such as VC and VP and QoS parameters included within the configuration request cell. In another embodiment, the configuration set up cell may be formed by InPORT processor 416 from data received from OutPORT processor 516. When the virtual circuit is no longer needed, a configuration tear down cell arranged to invalidate virtual circuit 800 is created and passed along virtual circuit 800 where it invalidates all associated connection tables.

A user wishing to use digital network 200 may choose any one of a number of communications devices coupled to the ATM switch 202 to initiate a call. In the described embodiment, the user initiates the connection procedure within digital network 200 by establishing the destination port and quality of service (QoS) appropriate for the type of communications device used. Using the example of telephone 201, the call initiation procedure includes dialing the telephone number of desired destination device. The call initialization signal is then passed to InSAR 412 along connection link 205. In one embodiment, a configuration request cell CRC may be included within the call initialization signal. In another embodiment, CRC may be generated by InSAR 412. CRC may be formatted to include information related to virtual circuit routing and QoS related to the call being made. An example of a configuration request cell format is ATM cell header 122 discussed above.

Substantially simultaneously with the receipt of a call initialization signal at InSAR 412, a SETUP signal is generated by InPORT processor 416 and forwarded to both SU processor 602 and OutPORT processor 516 by way of bus 601. OutPORT processor 516 responds to SETUP signal by echoing back to both SU processor 602 and InPORT processor 416 connection parameters such as (VC, VP) associated with virtual circuit 800. InPORT processor 416 then updates an input lookup table device (not shown) associated with InSAP 414 with the appropriate routing data (such VC, VP) applicable to virtual circuit 800. In the described embodiment, InCCC 415 then uses the information from CRC and the look up table device to generate a configuration set up cell CSC.

CSC is then passed to a second configuration cell configurator CCC 615 associated with SU 600. In the described embodiment, CCC 615 includes routing tables associated with virtual link 800b used, in part, to form virtual circuit 800. Once the routing tables included with SU 600 are updated and validated by CSC, CSC is passed to OutSAP 514 where associated connection tables are updated and validated to define virtual link 800c. In this manner, virtual links 800a, 800b, and 800c may be used to define virtual circuit 800 in a hop by hop manner through ATM switch 202. After successful updating of all appropriate connection tables defining virtual circuit 800, CSC is discarded. ATM switch 202 is now capable of transporting call related ATM cells bi-directionally from INPORT 410(p) to OutPORT 510(p) by way of virtual circuit 800.

Figure 4:
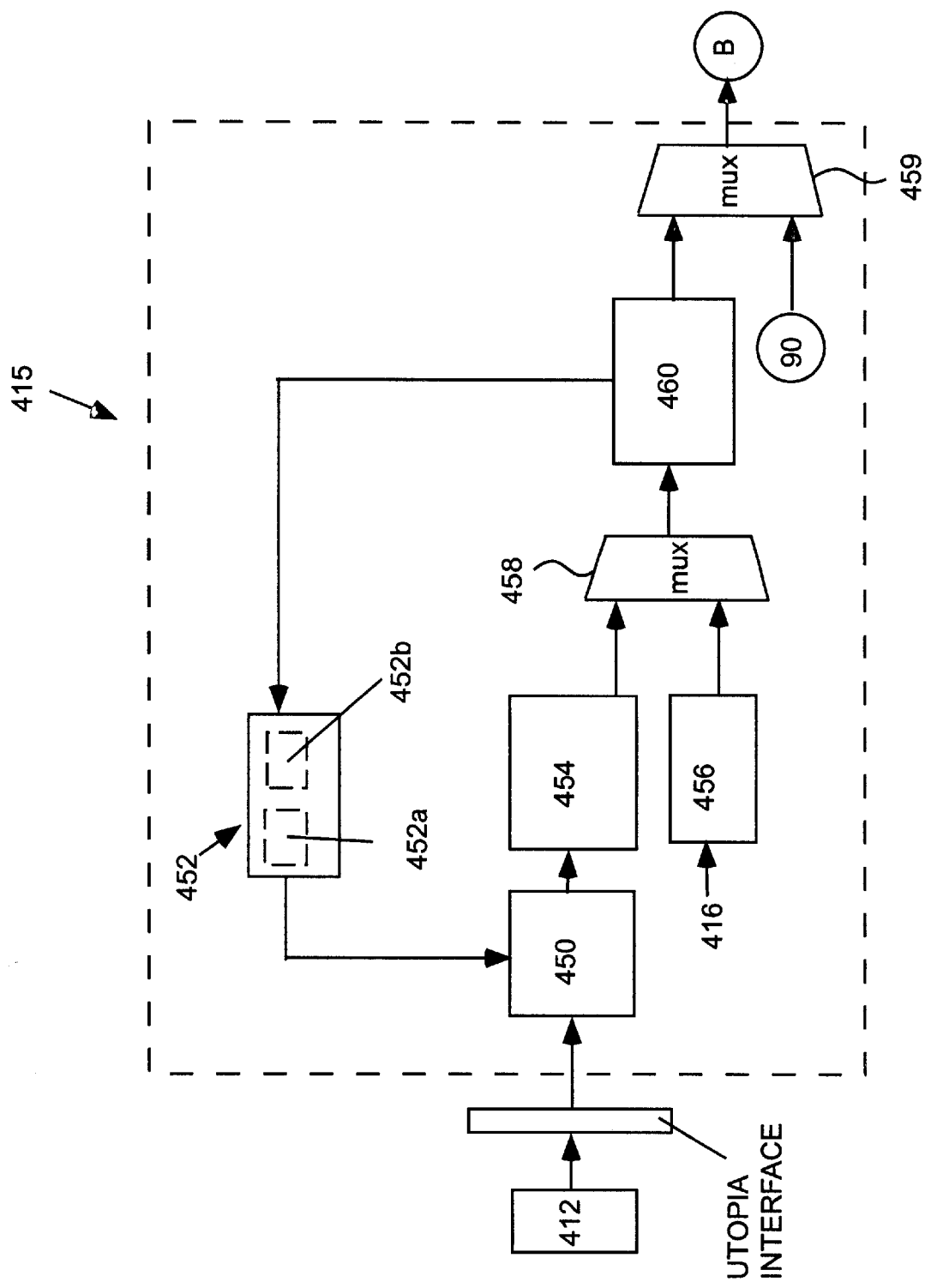
FIG. 4 is a functional block diagram of a first configuration cell configurator associated with a first switched access port in accordance with an embodiment of the invention.
Figure 5:
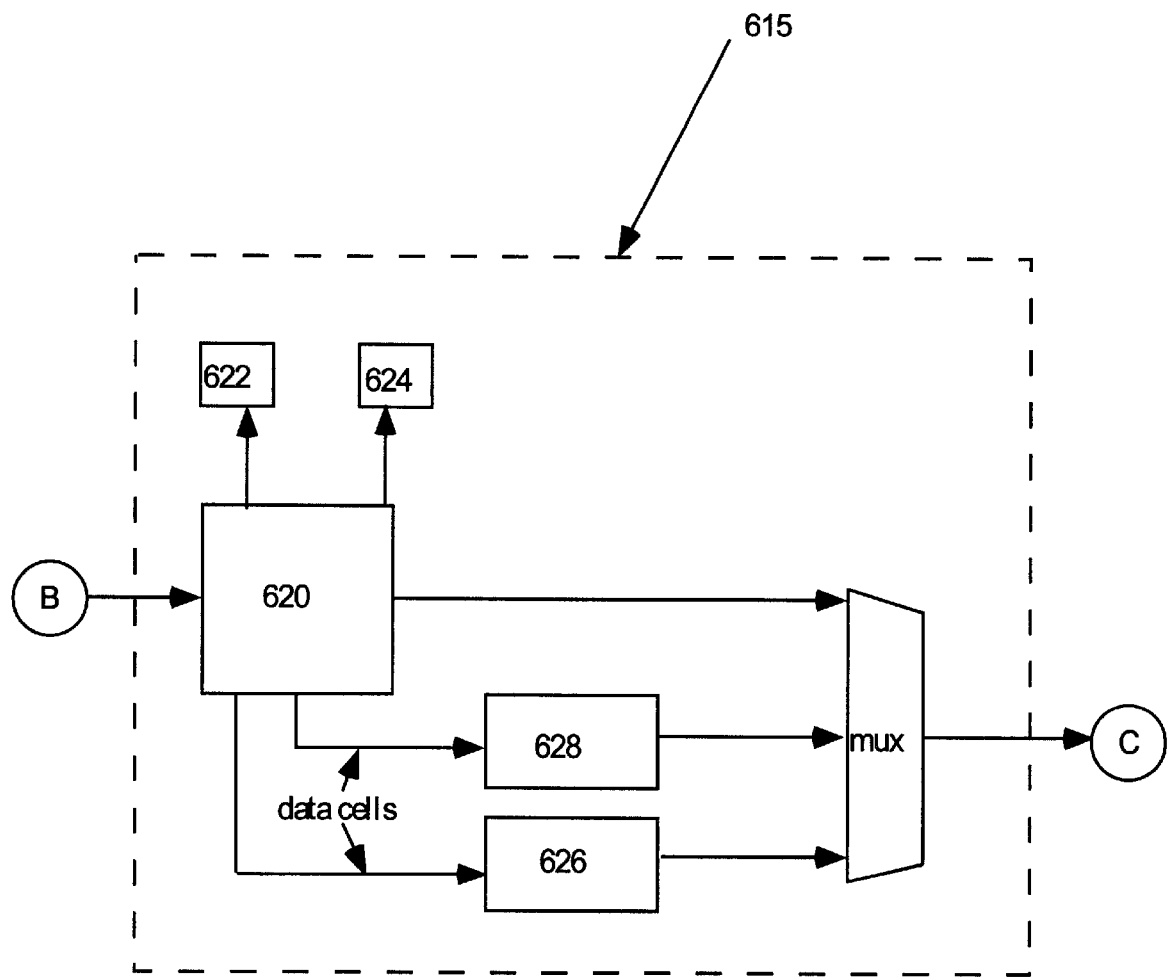
FIG. 5 is a functional block diagram of a second configuration cell configurator associated with a switch unit in accordance with an embodiment of the invention.
Figure 6:
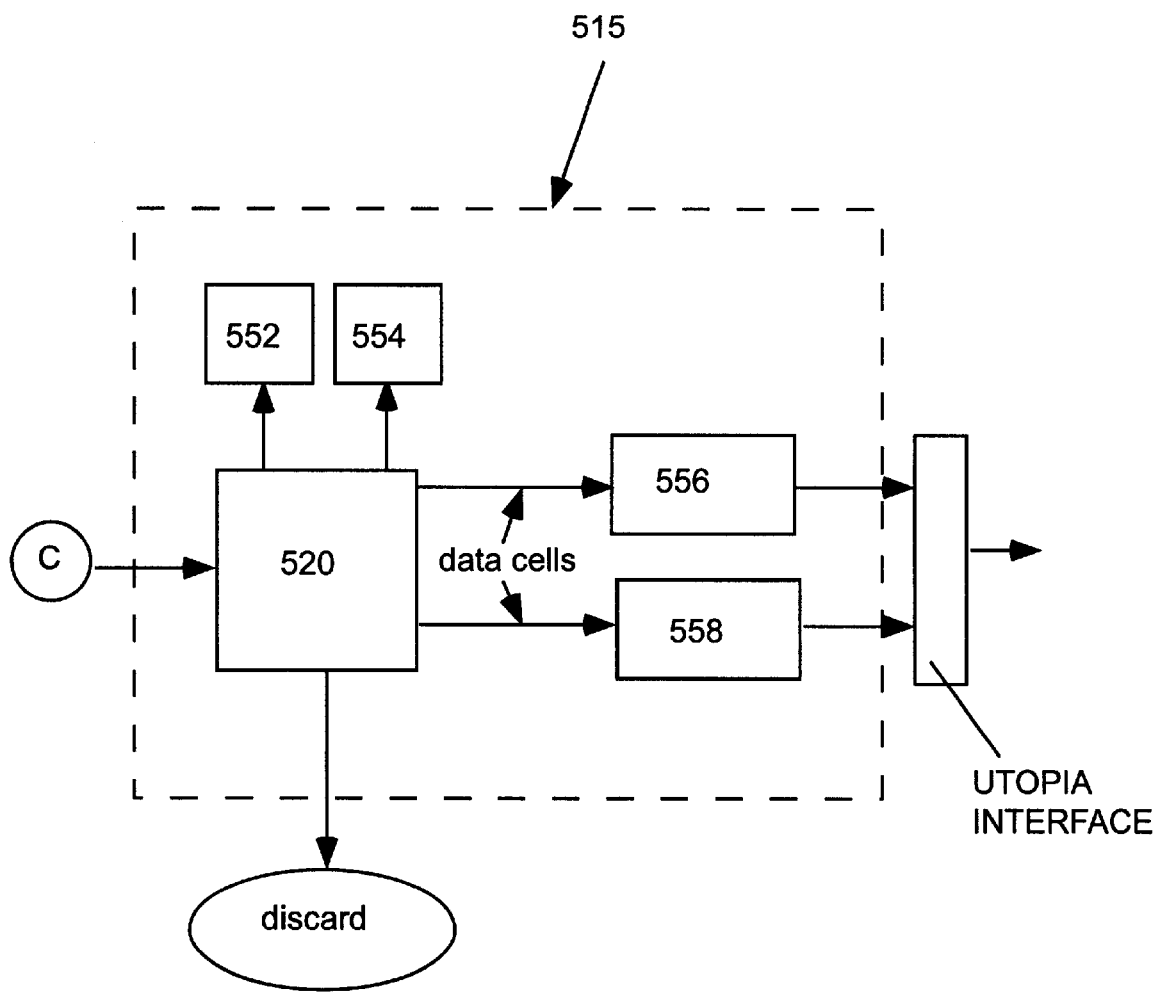
FIG. 6 is a functional block diagram of a third configuration cell configurator associated with a second switched access port in accordance with an embodiment of the invention.

Referring to FIGS. 4–6 a process for creating CSC by InSAP 415 and its subsequent use in defining virtual circuit 800 will now be described. Turning first to FIG. 4, a functional block diagram of InCCC 415 is presented highlighting input buffer 450, configuration cell translator 454, configuration cell handler 460, and InSAP memory device 452. In the described embodiment, InSAR 412 has an output node coupled to an input node of the configuration cell translator 454. InSAR 412 is suitably disposed to receive the configuration request cell and pass it to input buffer 450 which is coupled to InSAP memory device 452 as well as configuration cell translator 454. In the described embodiment, configuration cell translator 454 has an output that forms a first input to a multiplexer unit 458 having an output coupled to configuration cell handler 460. Configuration cell handler 460 is also coupled to memory device 452 as well as switch unit SU 600 by way multiplexer unit 459. The multiplexer 459 also receives input from 90 (see FIG. 10A). It should be noted that InSAP memory device 452 includes a VPI, VCI lookup table memory unit 452a and a connection table 452b. The look-up table unit 452a being suitably disposed to enable input buffer 450 to receive VPI, VCI parameters as pointers to determine appropriate virtual path VP and virtual channel VC parameters associated with virtual circuit 800.

In another embodiment, processor 416 is coupled to a PCI configuration cell insertion unit 456 which is capable of receiving the configuration cell as created by processor 416. An output of PCI configuration cell insertion unit 456 forms a second input to multiplexer 458 having its output coupled to configuration cell handler 460.

Once CRC has been received by and queued in table lookup device 450, the VCI, VPI parameters included in CRC are used as pointers by which the appropriate routing parameters (VP,VC) stored in look up table memory device 452 are retrieved. Configuration cell translator 454 then forms CSC by combining the retrieved routing parameters (VP, VC) and the QoS parameters associated with virtual circuit 800 included in CRC. In another embodiment, InPORT processor 416 may be coupled to PCI interface 456 wherein CSC is formed.

In the described embodiment, CSC may include such data fields as shown in Table 1.

TABLE 1

| Field Name | Location | Size (bits) | Description |
|---|---|---|---|
| Pseudo Header | 1–4 | 1–3 | Normal Pseudo Header format |
| Type Indicator | 4 | 4 | Indicates the Type of Configuration Cell Unicast call set up Unicast call tear down First multicast call setup Multicast leaf addition Multicast leaf tear-down Last multicast tear-down |
| InSAP | 5–15 | 10 | InSAP Configuration Data VC table data VC table data Connection valid Connection ID # Connection priority Policer class Threshold class |
| OutSAP | 16–28 | 12 | OutSAP configuration data Connection ID # Connection priority Output Port # Output header Multicast table pointer Port bitmap for multicast Multicast offset for header |

It should be noted that Table 1 is but one possible configuration for CSC.

Configuration cell handler 460 then updates routing tables included with look up table memory device 452 to reflect (VP, VC) of virtual circuit 800. CSC is then passed to SU 600 by way of virtual link 800a.

Referring now to FIG. 5 which illustrates a functional block diagram of a second configuration cell synthesizer CSS 615 associated with switch unit SU 600 in accordance with an embodiment of the invention. CSS 615 is disposed to receive CSC from CSC handler 620 by way of virtual link 800a. CSC handler 620 receives CSC to a buffer included within CSC handler 620 (not shown). CSC handler 620 then substantially simultaneously validates and updates a unicast connection table 622 to reflect the routing parameters and QoS parameters associated with virtual link 800b. CSC is then passed to OutSAP 516 by way of virtual link 800c. As shown, a unicast queue buffer 626 and a multicast queue buffer 628 are used to hold in transit ATM data cells until the receipt of an appropriate release signal based on a resident arbitration and conflict resolution algorithm.

FIG. 6 illustrates a functional block diagram of CSS 515 illustrating configuration cell buffer 520 suitably disposed to receive CSC from SU 600. Once received and stored in configuration cell buffer 520, CSC updates a unicast connection table 552 to reflect the routing parameters and QoS parameters associated with virtual link 800c. After the unicast connection table 552 associated with virtual link 800c is updated, CSC is discarded. As shown, a unicast queue buffer 556 and a multicast queue buffer 558 are used to hold in transit ATM data cells until the receipt of an appropriate release signal based on a resident arbitration and conflict resolution algorithm.

Figure 7:
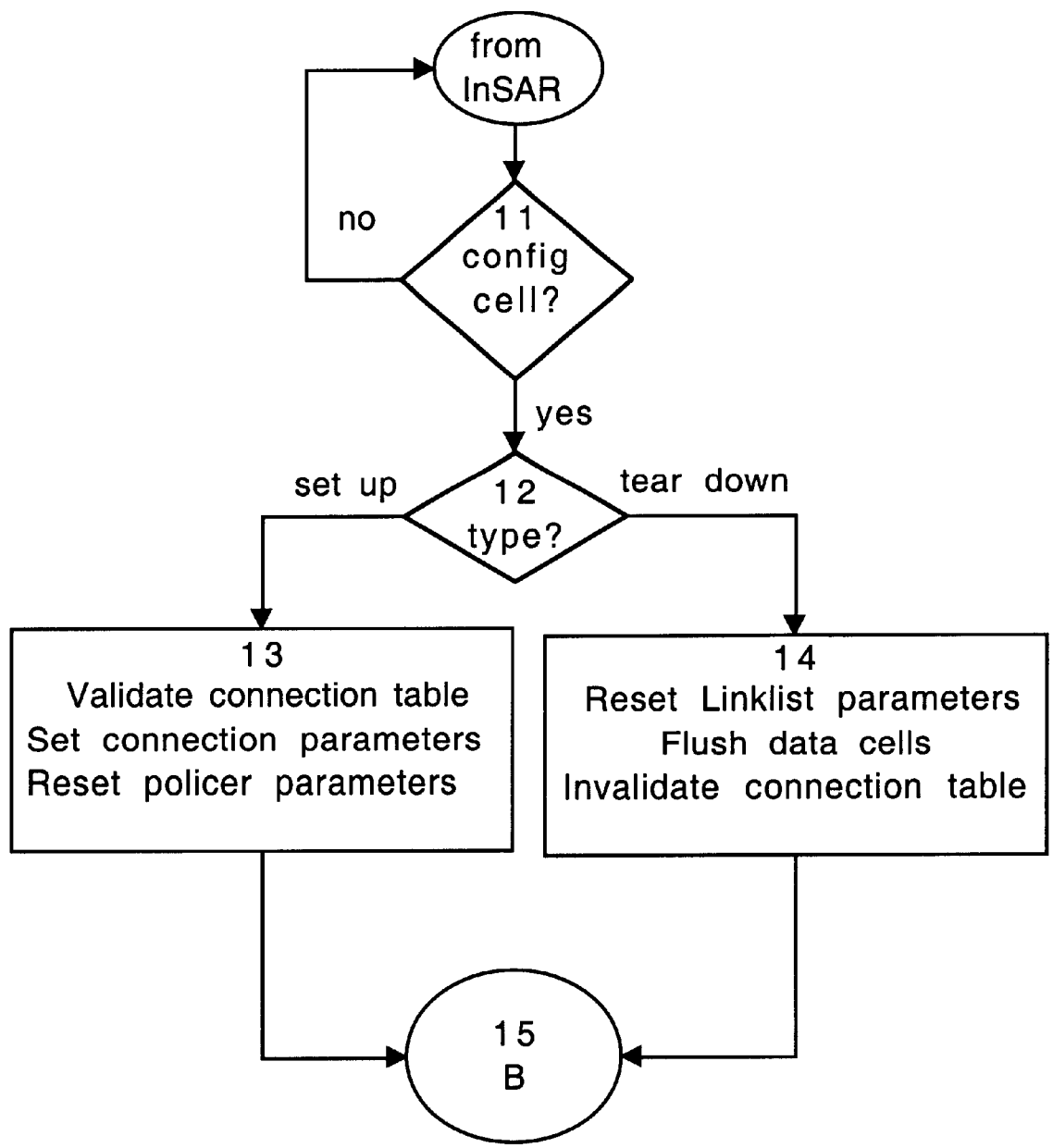
FIG. 7 is a flowchart detailing the creation of a configuration set up cell and a configuration tear-down cell in accordance with one embodiment of the invention.
Figure 8:
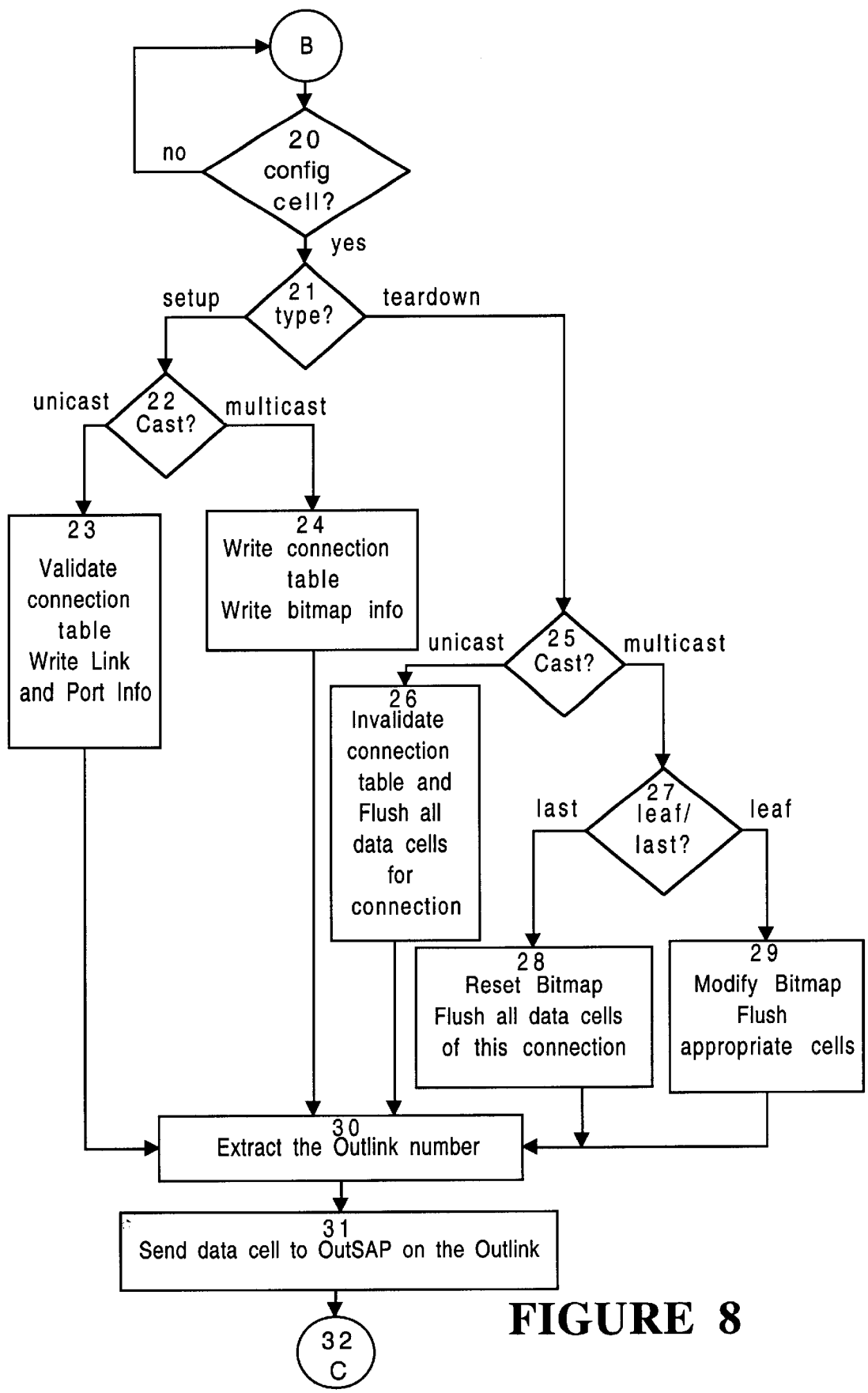
FIG. 8 is a flowchart illustrating the procedure whereby a configuration cell updates associated connection tables included within a switch matrix unit in accordance with an embodiment of the invention.
Figure 9:
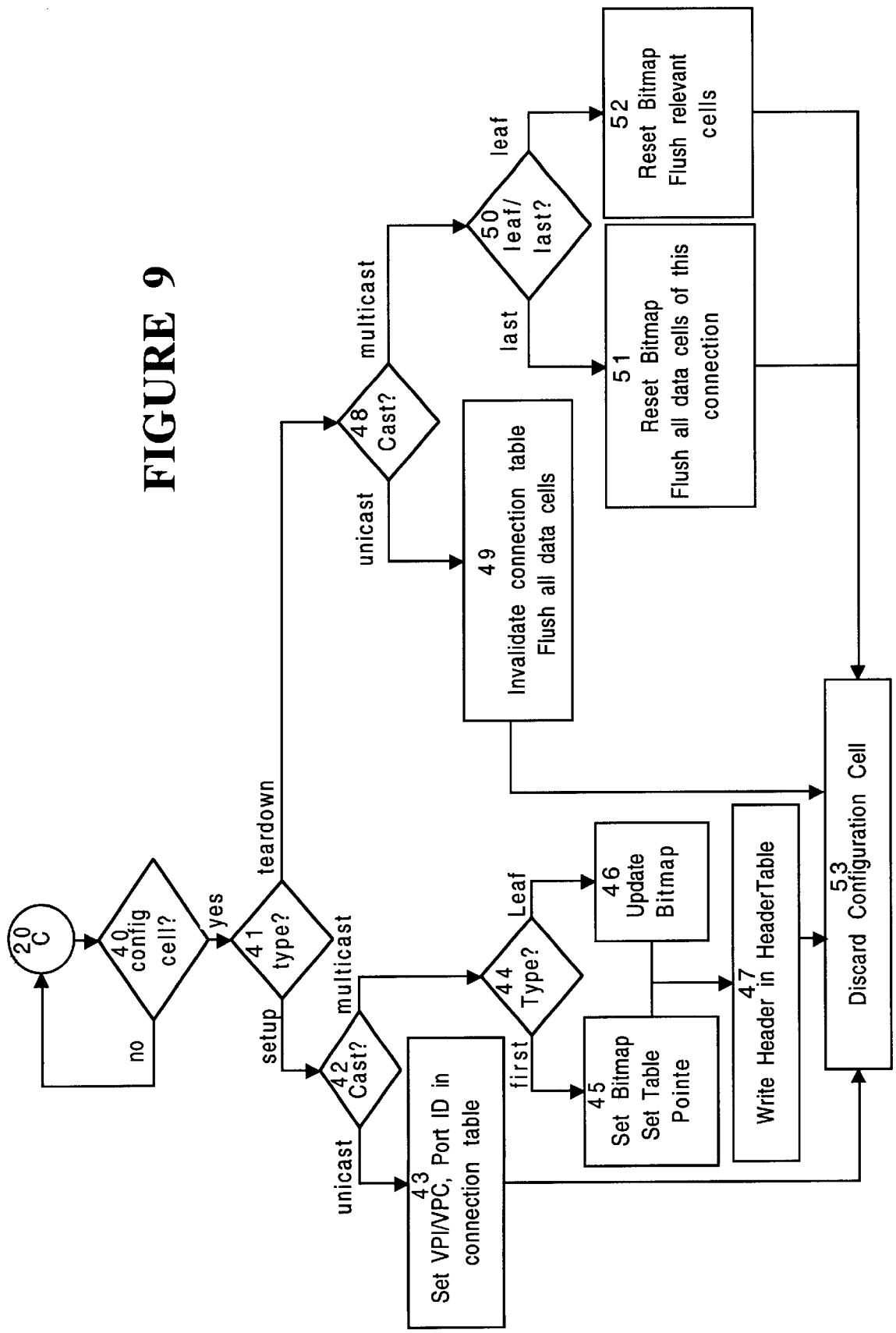
FIG. 9 is a flowchart illustrating the procedure whereby a configuration cell updates associated connection tables included within a destination SAP in accordance with an embodiment of the invention.

FIGS. 7–9 are flowcharts each describing the operations used to automatically configure a virtual circuit in ATM switch system 200 in accordance with one embodiment of the invention.

FIG. 7 is a flowchart describing the creation of a configuration cell in accordance with one embodiment of the invention. During a call initialization, if it is determined 11 that an incoming ATM cell is a configuration request cell, it is then determined 12 whether it is a set up type or a tear down type. If it is determined to be a set up type, then the connection tables associated with InSAP 415 are validated 13. Validation refers to the process whereby a validity bit, or some other flag, is set to indicate that the connection data contained within the respective connection table are valid and appropriate to the virtual circuit being set up. Once the validation flag is set, the connection parameters in the associated connection table are set and the policer parameters are reset to reflect the current QoS and traffic parameters. As discussed earlier, the policer parameters are used to affirm that each ATM cell meets certain traffic and QoS requirements.

Alternatively, if it is determined 12 that the configuration cell is a tear down type, the connection table is invalidated 14 wherein, as above, the validation flag is set to a value to indicate the associated connection table is no longer operative to define the virtual circuit. In addition, any ATM data cells associated with the invalidated virtual circuit are flushed (i.e., either disposed of or sent to the next connective node) and the linklist parameters are reset. After the connection tables have been updated the configuration cell of either type is forwarded to SU 600.

Referring now to FIG. 8 which is a flowchart illustrating the procedure whereby a configuration set up cell updates associated connection tables included within a switch matrix in accordance with an embodiment of the invention. After the configuration cell has been received 20 by SU 600, it is determined 21 whether the configuration cell is a set up type or a tear down type. If it determined that it is a set up type configuration cell then it is further determined 22 whether it is a unicast or a multicast type of configuration set up cell. If it is a unicast configuration set up cell 23, then the connection table associated with switch matrix SU 600 is validated and updated by writing the appropriate link and port information corresponding to virtual circuit 800. If, however, it is determined 22 that the configuration set up cell is a multicast type then the appropriate connection table is validated and updated 24 wherein is included multicast bitmap indicative of the links associated with the various leafs.

Alternatively, if it has been determined 21 that the configuration cell is a tear down type, then it is further determined 25 whether it is a unicast tear down cell or a multicast tear down cell. If the tear down cell is determined to be a unicast type then the associated connection tables are invalidated 26, as described above, whereas if the tear down cell is a multicast type, then it is further determined whether it applies to a last or another leaf 27. If it is determined that the configuration tear down cell applies to a last leaf of a multicast call, then the multileaf bitmap is reset and all data cells associated with the multicast call are flushed 28 (i.e., all leafs are invalidated). If, however, it is determined that the configuration tear down cell applies to a leaf other than a last, then the multicast bitmap associated with that leaf is modified accordingly and any ATM data cells associated with that leaf are flushed 29.

After all appropriate connection tables have been updated, an outlink number is extracted 30 and the configuration cell is sent 31 to OutSAP 515 for a unicast type configuration cell and then next port in the case of a multicast type configuration cell other than a last, otherwise to it is sent 31 to OutSAP 515.

FIG. 9 is a flowchart illustrating the procedure whereby a configuration cell updates associated connection tables included within an output SAP in accordance with one embodiment of the invention. After a configuration cell is received 40 at OutSAP 515, a determination 41 of whether it is a set up or a tear down type is made. If it is determined to be a set up type configuration cell, then it is further determined 42 whether it is a unicast or a multicast set up cell. If it is determined to be a unicast set up type configuration cell, then the connection table associated with OutSAP 515 is validated and updated 43 with the appropriate data corresponding to virtual circuit 800. If it is determined to be a multicast set up type configuration cell, then it is further determined 44 whether it is a first leaf or another leaf. If it is determined to be a first leaf, then the associated bitmap is updated 45 and the table pointer is set (associating the table with virtual circuit 800 ). If, however, it was determined 46 to be another leaf, then the address in the bitmap associated with that leaf is updated. After the multileaf bitmaps have been updated for all leafs, then header data is written to the header table 47.

Alternatively, if it was determined 41 that the configuration cell is a tear down type cell, then it is further determined 48 whether the tear down type configuration cell is associated with a unicast or a multicast type call. If it is determined to be a unicast type call, then the associated connection tables are invalidated and all associated ATM data cells are flushed 49, as described above. If, however, it is determined that the tear down type configuration cell is associated with a multicast call, it is further determined 50 whether it is associated with last leaf or another leaf. If it is determined to be a last leaf, then the associated bitmap is reset and all ATM data cells associated with the associated leaf are flushed 51. Alternatively, if it is determined that the tear down type configuration cell is associated with another leaf of the multicast call, then the address in the multicast bitmap associated with that leaf is reset and all ATM cells associated with that leaf are flushed 52.

In all cases, after the appropriate connection tables have been updated, the configuration cell, regardless of type, is discarded 53.

Figure 10A:
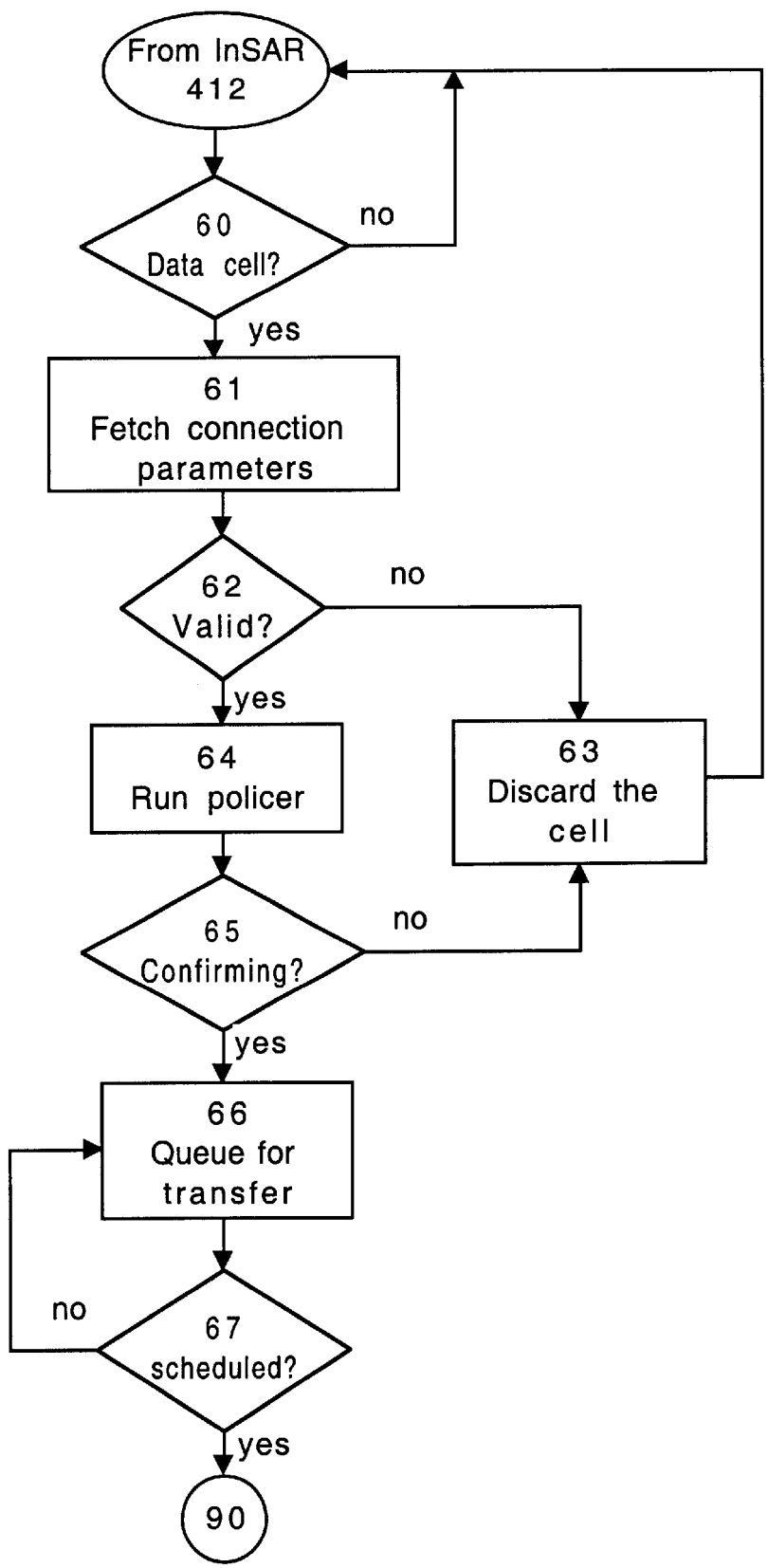
FIG. 10A is a flowchart illustrating the process whereby an ATM data cell is transported through a source SAP in accordance with an embodiment of the invention.
Figure 10B:
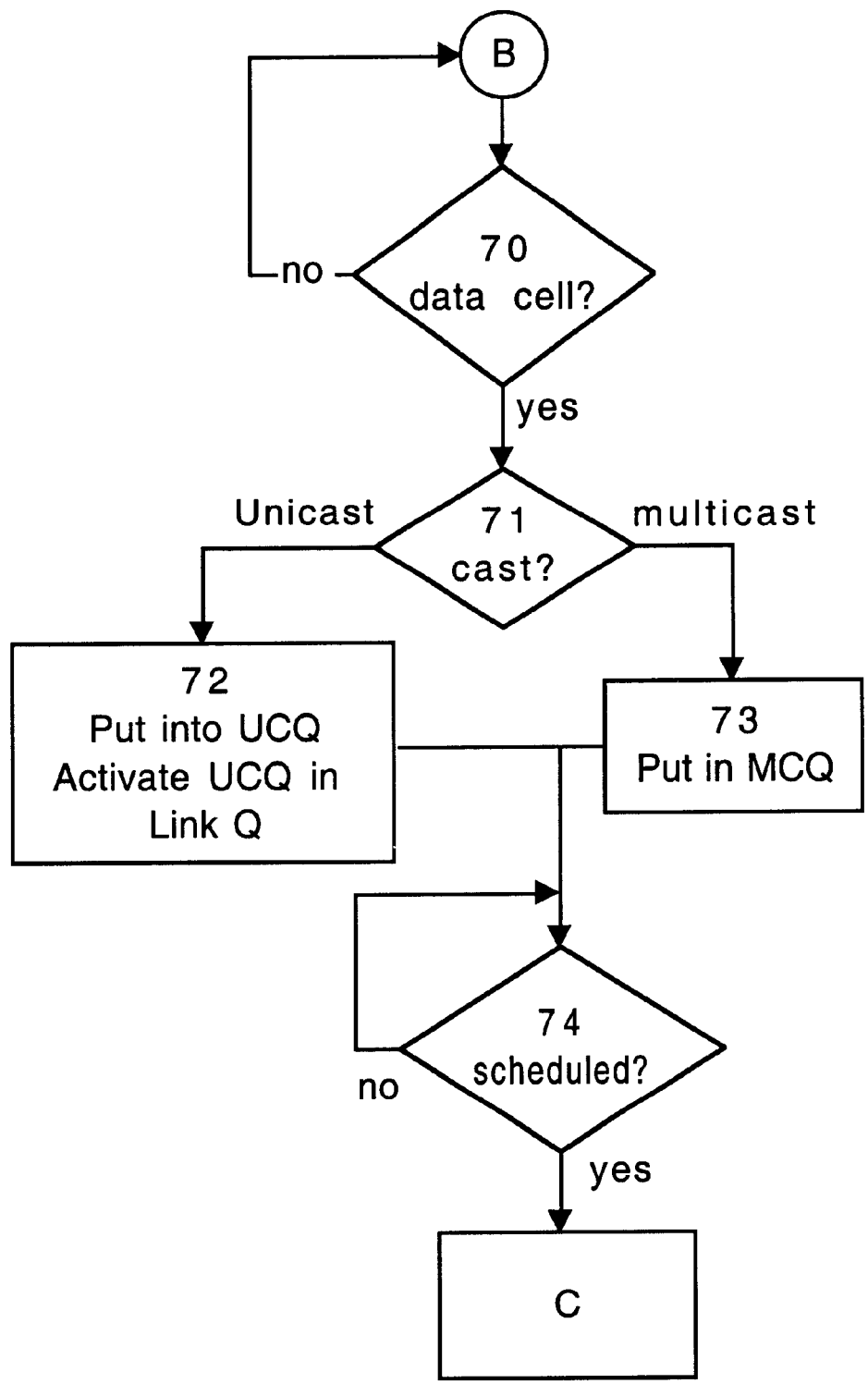
FIG. 10B is a flowchart illustrating the process whereby an ATM data cell is transported through a switch unit in accordance with an embodiment of the invention.
Figure 10C:
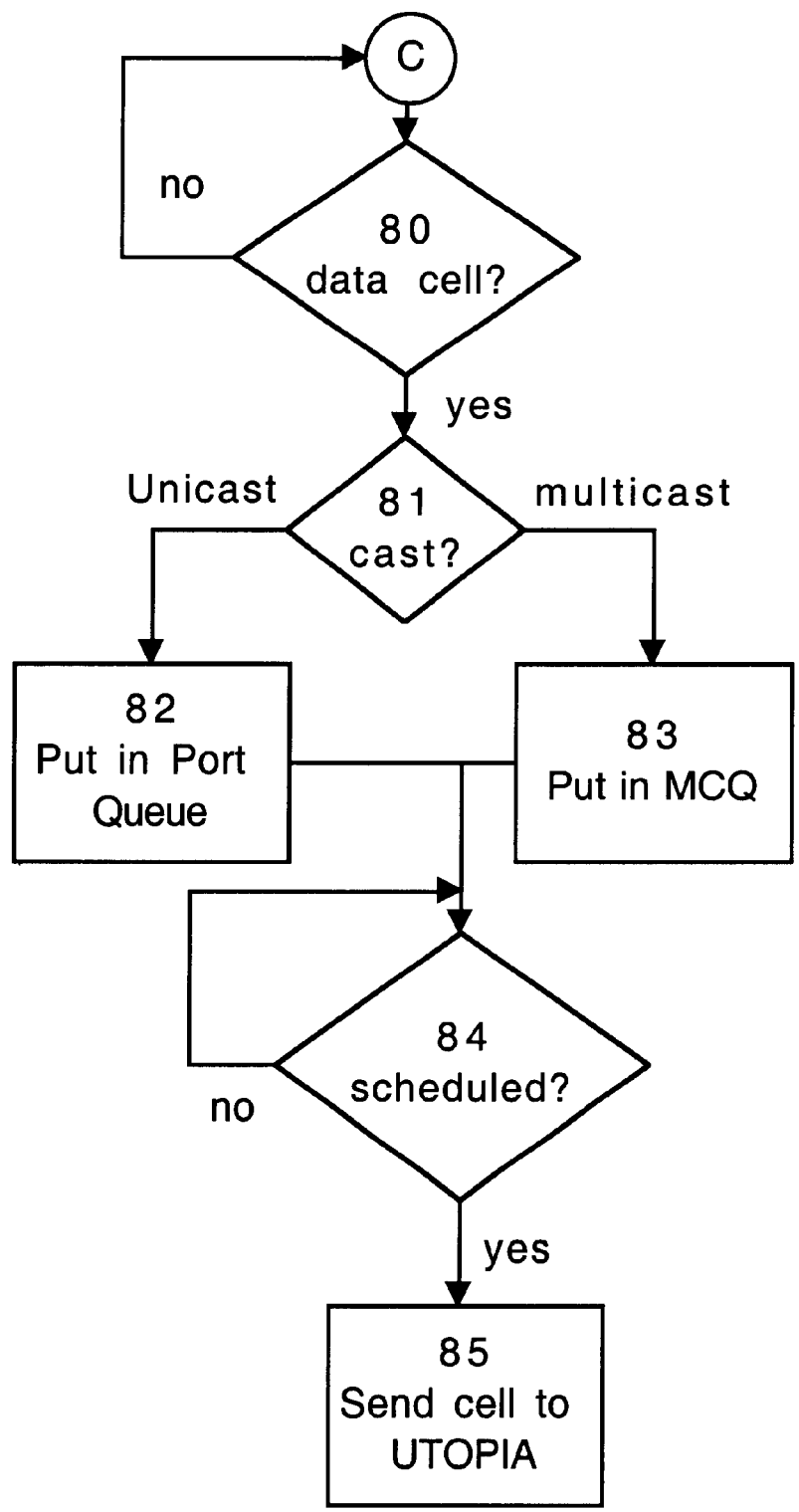
FIG. 10C is a flowchart illustrating the process whereby an ATM data cell is transported through a destination SAP in accordance with an embodiment of the invention.

Once virtual circuit 800 has been established, it may be used to transport any ATM cell associated with a call from device 201 to device 331 over digital network 200. FIGS. 10A through 10C are flowcharts describing how an ATM cell associated with the call is transported along virtual circuit 800 from input port 410(p) to output port 510(p).

FIG. 10A is a flowchart illustrating the process whereby an ATM data cell is transported through InSAP 412 in accordance with an embodiment of the invention. First, a data cell is received at InPORT 410(p) where it is determined to be an ATM data cell or a configuration cell 60. If it is determined to be an ATM data cell, the connection parameters included within the connection table associated with InSAP 412 are fetched 61 and a validity determination 62 is made. If it is determined that the connection parameters are valid, then a policer check is performed 64 as described above. If it is determined that the connection parameters are not valid then the ATM cell is discarded 63. If it is determined that the ATM data cell does not pass the policer requirements 65, then it is also discarded 63. If, however, the ATM cell is confirmed to pass all QoS parameters, then it is passed 66 to a transfer queue buffer where it awaits to be the proper scheduling signal to be passed 67 to 90 and then switch matrix SU 600.

FIG. 10B is a flowchart illustrating the process whereby an ATM data cell is transported through SU 600 in accordance with an embodiment of the invention. After being passed from InSAP 414, the ATM data cell is received by SU 600 where it is determined whether it is associated with a unicast or a multicast call 71. If it is determined to be a unicast call, then the ATM data cell is placed into a unicast queue buffer 72 associated with the appropriate unicast link. If it is determined to be a multicast call, then the ATM data cell is placed 73 into the appropriate multicast queue buffer. In both cases, the queued ATM data cell must await the proper scheduling signal 74 before it is passed to OutPORT 510(p).

Referring now to FIG. 10C which is a flowchart illustrating the process whereby an ATM data cell is transported through OutPORT 510(p) in accordance with an embodiment of the invention. When the ATM data cell has been received at OutPORT 510(p) 80, it is determined 81 whether it is associated with a unicast or a multicast call. If it is determined that the ATM data cell is associated with a unicast type call, then it is queued in a port queue where it waits for the proper scheduling signal 82. If it is determined that the ATM data cell is associated with a multicast type call, then the ATM data cell is placed into a multicast queue where it too must await a proper scheduling signal 83.

Once the proper scheduling signal is received 84, the queued ATM data cell may be pass by way of an appropriate interface, such as a UTOPIA (Universal Test and Operations Interface), to any external node(s) associated with the appropriate receiving communication device(s) thus completing the call from the sender device to the receiver device.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of automatically forming a virtual circuit, comprising:

creating a configuration cell;

passing the configuration cell to a destination node by way of at least one connective node, the configuration cell updates and validates an associated connection table, the associated connection table being capable of defining a virtual link, the virtual link being part of the virtual circuit, the virtual circuit being included in an ATM switch system having a first bi-directional port, and the virtual circuit being used to transport an ATM cell from the first bi-directional port to the destination node;

generating a configuration request cell, the configuration request cell being associated with a plurality of related ATM data cells wherein the plurality of related ATM data cells define an associated communication session; and receiving the configuration request cell at the first bidirectional port included within an ATM switch, wherein the first bi-directional port includes,
a configuration cell translator,
a memory device having readable/writeable lookup table suitable for storing a plurality of routing parameters and a first connection table coupled to the configuration cell translator, and
a configuration cell handler coupled to the memory device and the configuration cell translator, the configuration request cell includes a plurality of virtual circuit routing parameters and a plurality of quality of service (QoS) parameters associated with the virtual circuit.

2. A method of automatically forming a virtual circuit as recited in claim 1 wherein the first connection table stores selected ones of the plurality of routing parameters and selected ones of the plurality of quality of service (QoS) parameters.

3. A method of automatically forming a virtual circuit as recited in claim 2 wherein the configuration request cell includes at least a virtual path identifier (VPI) and a virtual channel identifier (VCI), the VPI and the VCI being used to point to virtual path (VP) and virtual channel (VC) parameters included in the look up table.

4. A method of automatically forming a virtual circuit as recited in claim 3 wherein the configuration cell is a configuration set up cell, the configuration set up cell includes selected ones of the plurality of routing parameters and selected ones of the plurality of quality of service parameters associated with the virtual circuit, the configuration set up cell being arranged to form the virtual circuit.

5. A method of automatically forming a virtual circuit as recited in claim 4 wherein the creating a configuration setup cell further includes:

reading the virtual path (VP) parameter and the virtual channel (VC) parameter from the lookup table, the VP parameter being associated with the VPI and the VC parameter being associated with the VCI;

inputting each of the VP parameters and the VC parameters to the plurality of routing parameters included within the configuration set up cell; and inputting each of the selected quality of service parameters included within the configuration request cell to appropriate locations within the configuration set up cell.

6. A method of automatically forming a virtual circuit as recited in claim 5 further including:

validating the first connection table;

writing the connection parameters associated with the virtual circuit to the first connection table;

resetting policer parameters in the first table to current policer parameters;

passing the configuration set up cell to another selected one of the multiplicity of connective nodes; and updating and validating the connection table associated with the selected connective node.

7. A method of automatically forming a virtual circuit as recited in claim 6 further including:

determining if the selected connective node is a last connective node used to define the virtual circuit, if it is determined to be the last connective node then the configuration set up cell is discarded; and if it is determined that the selected connective node is not the last connective node, then passing the configuration set up cell to another selected one of the multiplicity of connective nodes.

8. A method of automatically forming a virtual circuit as recited in claim 3 wherein the configuration cell is a configuration tear down cell.

9. A method of automatically forming a virtual circuit as recited in claim 8 further including:

passing the configuration tear down cell to each of the selected ones of the multiplicity of connective nodes associated with the virtual circuit;

invalidating each of the connection tables;

resetting the connection parameters in each of the connection tables; and flushing all ATM data cells from the associated connection.

10. An automatic virtual circuit configurator, comprising:

a configuration request cell generator, a configuration request cell being capable of generating a configuration request cell, the configuration request cell having a plurality of routing parameter pointers and a plurality of quality of service parameters used to define a virtual circuit;

a configuration cell translator coupled to the configuration request cell generator, the configuration request cell translator being disposed to receive the configuration request cell, the configuration cell translator being capable of reading selected ones of the plurality of routing parameters included in a look up table wherein the selected routing parameters are associated with selected routing parameter pointers, the look up table being associated with a memory device, the memory device also includes one of a plurality of connection tables used to store appropriate routing and quality of service parameters, the configuration cell translator being capable of forming a configuration set up cell by combining the selected ones of the routing parameters and selected quality of service parameters used to define the virtual circuit; and a configuration cell handler coupled to the configuration cell translator, the configuration cell handler being disposed to receive the configuration set up cell, the configuration cell handler being capable of updating the first connection table with the selected routing and quality of service parameters associated with the virtual circuit, the configuration cell handler is also capable of passing the configuration set up cell to a selected one of a plurality of connective nodes included within an ATM switch.

11. An automatic virtual circuit configurator as recited in 10 wherein the configuration cell handler creates a configuration tear down cell when it is determined that the virtual circuit is no longer valid.

* * * * *